United States Patent [19]
Sayles et al.

[11] 3,748,448
[45] July 24, 1973

[54] CONTROL SYSTEM FOR A REACTION PROCESS SYSTEM

[75] Inventors: John H. Sayles, Arlington Heights; Allen L. Pekar, Brookfield, both of Ill.

[73] Assignee: Universal Oil Products Company, Des Plaines, Ill.

[22] Filed: July 6, 1972

[21] Appl. No.: 269,377

Related U.S. Application Data

[63] Continuation-in-part of Ser. No. 160,022, July 6, 1971.

[52] U.S. Cl...... 235/151.12, 208/DIG. 1, 235/150.1
[51] Int. Cl.............................................. G06g 7/58
[58] Field of Search...................... 235/150.1, 151.1, 235/151.12; 208/DIG. 1, 308, 106, 113

[56] References Cited
UNITED STATES PATENTS

| | | | |
|---|---|---|---|
| 3,497,449 | 2/1970 | Urban........................ | 235/151.12 X |
| 3,649,202 | 3/1972 | Bajek et al.................. | 235/151.12 X |
| 3,653,842 | 4/1972 | Putman....................... | 235/151.12 X |

Primary Examiner—Joseph F. Ruggiero
Attorney—James R. Hoatson, Jr. et al.

[57] ABSTRACT

Control system for optimizing and stabilizing consumption of the reactants of a reaction process system. The control system comprises a system control means which receives system condition signals from the reaction process system and which generates adjustment signals for controlling the reaction process system. One of the system condition signals is the amount of consumption of an uncontrollable reactant being supplied to the system. The system control means will generate a signal which is proportional to the uncontrollable reactant consumption signal received to control the severity of reaction within a reactor in the system. Another signal received by the control system is an index indicative of conversion and material balance of the system. In a preferred embodiment this particular signal represents the level of the bottoms in a fractionator column. The control means has computer means for computing the change of this index with respect to time and for determining a parameter of comparison whose value is a function of the value of this index. Comparator means compares the actual rate of change of the index with the parameter of comparison and generates a signal for activating controller means in the reaction system. Comparator means is also provided to compare the index with limits of deviation and for generating signals for activating controller means in the reaction process system.

16 Claims, 3 Drawing Figures

CONTROL SYSTEM FOR A REACTION PROCESS SYSTEM

This application is a continuation-in-part of our co-pending application Ser. No. 160,022 filed July 6, 1971.

BACKGROUND OF THE INVENTION

The present invention relates to a control system for a reaction system wherein at least two reactants are utilized, one being an uncontrollable and varying supply. In the petroleum refinery business, many processes fall into this category. That is, they require at least two reactants and of one of those may be in an uncontrollable and varying supply. Usually this occurs when one of the reactants is the product of other independent process of the refinery. For example, in a reforming process there is generally a net gain in hydrogen in the effluent. This hydrogen may be utilized in another part of the plant such as in the hydrocracking of crude oil to produce gasoline components. Depending upon the particular production schedules of a refinery there may occur the possibility that less hydrogen is produced by reforming than can be used by the hydrocracking process. If this is the case, the hydrocracking process is hydrogen limited. For economic purposes it is desirable to use all the hydrogen available. As the supply of hydrogen varies, readjustment of the operating conditions of the hydrocracking unit is necessitated. This is a very difficult task for process operators to efficiently and consistently proceed with and generally if done manually will result in the venting of much hydrogen and thus the loss of potential profit from the hydrocracking unit.

SUMMARY OF THE INVENTION

Thus, it is a principal object of this invention to provide for a control system for a reaction process system which fully utilizes a reactant that is in an uncontrollable, varying and limited supply.

Another object of this invention is to provide for a control system for a hydrocracking unit wherein hydrogen is in uncontrollable, varying and limited supply and wherein such hydrogen is utilized to the maximum extent possible.

Another object of this invention is to maximize the amount of the second reactant which is processed in combination with the reactant which is only available in an uncontrollable, varying and limited supply.

A still further object of this invention is to simultaneously accomplish the maximum utilization of the aforesaid reactants.

In a broad aspect, the present invention provides for a control system for a reaction process system having at least one reactor with inlet means for introducing at least two reactants therein, one being in uncontrollable and varying supply and the second being in controllable supply. The reaction process system would have, or course, outlet means for discharging the reactor effluent therefrom which broadly may include separators, fractionators, and the like. The control system is designed for optimizing and stabilizing the consumption of the reactants and it maintains an index indicative of conversion and material balance of the system within predetermined limits of deviation. This index will comprise a factor which indicates the percentage of conversion and the amount of controllable reactant being converted. The control system will comprise (a) first regulating means connected to the inlet means for regulating the supply of the controllable reactant; (b) second regulating means connecting to said reactor for regulating the severity of reaction therein; (c) first sensing means connected to said reaction process system for generating a signal representative of the amount of controllable reactant being supplied to the reactor; (d) second sensing means connecting to said reaction process system for generating a signal representative of the severity of the reaction therein; (e) third sensing means connecting to said reaction process system for generating a signal representative of the index indicative of conversion and material balance of the system; (f) fourth sensing means connecting to said reaction process system for generating a signal representative of the amount of consumption of uncontrollable reactant being supplied to said reactor; (g) first controller means connecting to said first regulating means for controlling the regulation thereof; (h) second controller means connecting to said second regulating means for controlling the regulation thereof; and, (i) system control means connecting to said sensing means and to said controller means for receiving said generated signals and for generating adjustment signals for controlling said reactor system. The system control means will include (1) first computer means for determining changes in the signal representative of the amount of consumption of the uncontrollable reactant being supplied to said system and for generating an adjustment signal proportional to the changes for activating the second controller means to control the severity of reaction. Thus, the severity of reaction will be determined by the amount of uncontrollable reactant being consumed and will be adjusted to consume maximum amounts of the uncontrollable reactant.

In a preferred embodiment this aspect of the system control means will be generated by digital computer means and the computer means will store a digital representation of a reference signal representing the normal amount of consumption of uncontrollable reactant being supplied to the reactor.

Preferably, the system control means will scan the fourth sensing means and measure the amount of consumption of the uncontrollable reactant at predetermined intervals of time. It will then generate an adjustment signal whose magnitude is proportional to the sum of: a component proportional to the difference between the quantities resulting from subtraction of the two most recent readings and the reference signal; a component proportional to the sum of the differences between reference signal and at least the three most recent readings; and a component proportional to the sum of the differences between consecutive readings measured including at least five differences between the most recent measurements.

The system control means will further comprise a second computer means for computing the change of the index with respect to time and for determining a parameter of comparison whose value is the function of the value of the index. Also included will be the first comparator means for comparing the rate of change of the index with the parameter of comparison and for generating a signal for activating the first controller means in response to this comparison. A second comparator means is also included for comparing the actual value of the index with the limits of deviation and for generating a signal for activating the first controller means in response to such comparison. Preferably, the comparator means will also generate a signal to the second controller means whose magnitude is proportional to the signal to the first controller means. The magnitude of the adjustment signal made by the first comparator means to the first controller means is proportional to the rate of change of the index.

Preferably, when the value of the index lies beyond the limits and when the direction of the change of the index with respect to time indicates that the index will continue to depart from the limits, the comparator means will generate a signal for the first controller means whose magnitude is directly proportional to the change in the index with respect to time and also including components to reverse the trend of the index. Components to reverse the trend may include a constant added to the rate component to turn the trend of values and not merely to level it out. It is noted that this decision to make a correction is not made unless the value is outside of the limits.

The parameter of comparison determined by said second computer means will comprise a first variable parameter whose value is given by the absolute value of the difference between the measured value of the index and the more proximate limit, with respect to time, and when the change of the index with respect to time exceeds this first variable parameter, the first comparator means will generate a signal to said first controller means. This signal is proportional to the change in the value of the index with respect to time. Again preferably the first comparator means will also generate a signal to the second controller means proportional to the signal to the first controller means. It is noted that the magnitude of this correction can be variable depending upon the value of the proportionality constant selected.

When the value of the index lies within the limits and when the change of the index with respect to time exceeds the first variable parameter and when the index is approaching the more proximate limit, the comparator means will generate a signal to the first controller means, the generated signal being proportional to the change in the index with respect to time and including components to reverse the trend of the value, e.g., a constant.

If the absolute value of the change in index with respect to time exceeds the first variable parameter a correction will always be made. Preferably, a second variable parameter is used to determine another circumstance when the correction output will insure a trend reversal. The second variable parameter is given by the absolute value of: the difference between the measured value of the desired property and the more distant limit, with respect to time. When the absolute value of the change of the index with respect to time exceeds the second variable paraameter, the output is always computed so the trend reversal occurs.

It is noted that the present invention issues two types of correction. One is based on the amount of consumption of the uncontrollable reactant and is proportional to this amount. This correction signal adjusts the severity of reaction and thus can control the severity to change consumption of the uncontrollable reactant within relatively short time periods. When this occurs a change of the controllable reactant is generally required to react with the uncontrollable reactant. The control of the controllable reactant is determined by the second computer means. That computer means only issues a correction or adjustment signal which is proportional to the rate of change of the index measured. The magnitude of the error between the actual value of the index and the desired value of the index in no way influences the value of the correction action in the same manner as the standard proportional controller as far as control of controllable reactant.

It is only the fact that an error exists rather than its magnitude which influences the second computer means of the present control system. Another unique feature of the invention is that, the time sequence in which the correction action generated by the second computer means is a variable quantity and is also controlled by the rate of change of the index.

The present invention therefore differs from the prior art control system in that it provides for a correction whose magnitude is proportional only to the rate of change of the measured index, and in addition with the control action timing also being a function of the rate of change of the index.

The present control system is thus less affected by lag time than the proportional only, proportional plus reset etc. type of controller. An additional improvement is the use of a variable parameter which is a function of the instantaneous value of the variable itself. Thus the control system through the second computer means makes correction moves when the rate of change of an index exceed the variable parameter of comparison. Since the parameter of comparison is always changing in its relationship to the value of the index measured, the system itself determines when a control adjustment is needed. This is obviously an improvement over a fixed time interval to make corrections. It also will make corrections when the value of the index is beyond predetermined limits of deviation and is continuing to depart from such limits. Thus the essence of the present invention is the use of computer means to first compute a change in severity necessary to fully utilize a limited uncontrollable varying supply of reactant and to use a derivative function of an index indicative of conversion and material balance to accomplish both the magnitude and timing of corrections as determined by the function of the instantaneous value of the index to control the flow of the controllable reactant.

Although the broad embodiment of this invention may utilize analogue means to generate the time as well as the type of correction, digital means is also contemplated.

The reaction process system is directly applicable to hydrocarbon cracking processes wherein the uncontrollable reactant comprises hydrogen and wherein the reaction process system further comprises a pressurized liquid-vapor phase separation means connected to the downstream side of the reactor for separating any unreacted hydrogen in a gaseous phase from the effluent of the reactor, and fractionation means connected downstream from the liquid end of said separation means for separating in a liquid phase any unreated controllable reactant from the liquid effluent, and wherein the first regulation means includes means for recycling from the fractionation means unreacted controllable reactant to said reactor and wherein unreacted hydrogen is recycled from said separation means to said reactor. In this preferred embodiment the third sensing means comprises level indicating means connected to the fractionation means for generating a signal representing the level of the bottoms in said separation means. The level thus serves as the index indicative of conversion and material balance of the system. In other words, any change in level will indicate two things, that is, the percent of conversion and/or the material balance of the system. Assuming that the percent of conversion is constant, any change in the level in the fractionation means will indicate a net change in the controllable reactant put into the system. If the net change of controllable reactant is constant then any change in the level in the fractionation means will indicate a change in the percent of conversion of the reactor. In this embodiment the amount of consumption of the uncontrollable reactant hydrogen is preferably determined by pressure indicating means connected to the separation means which generates a pressure signal therein. Change in temperature in the reaction zone usually indicates change in severity of reaction. Thus, preferably the second sensing means comprises temperature sensing means connected to the reactor for generating a signal representing temperature therein.

This system is a distinctly new departure from previous control strategies primarily in the concept of maximizing fresh feed rate as the $H_2$ supply varies. It is also new in that both fractionation level and separator pressure are maintained at set points while simultaneously maintaining the unit in feed-hydrogen balance at 100 percent conversion.

Reference to the accompanying drawing and the following description thereof will serve to illustrate with more clarity the present invention and how it relates to the refinery process of hydrocracking a hydrocarbon.

Figure 1:
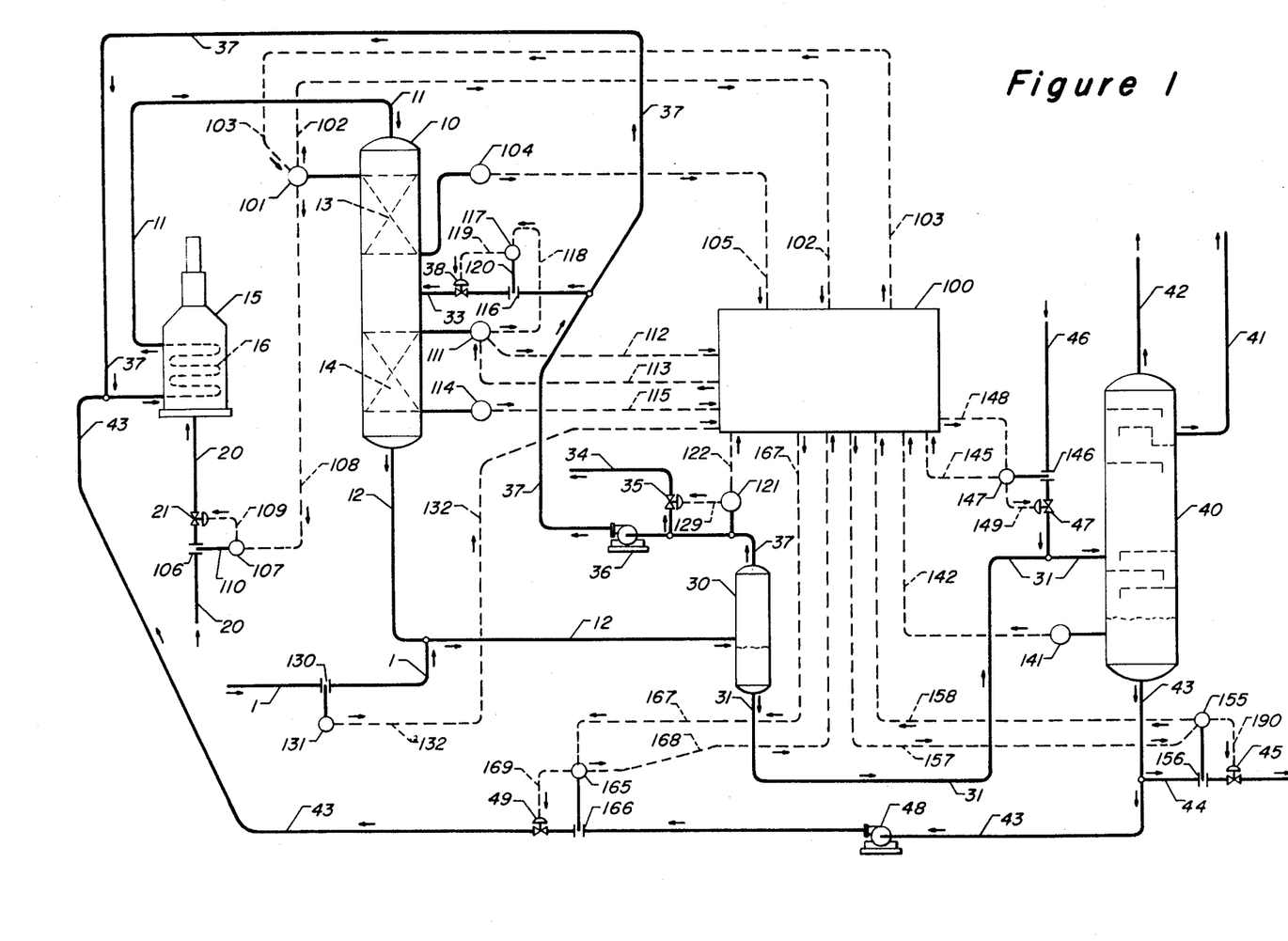
FIG. 1 of the drawing is a schematical illustration of a hydrocracking reaction process system utilizing the control system of this present invention.

Reference is now made to FIG. 1 of the drawing where there is shown a reactor 10 having two catalytically active reaction zones 13 and 14 therein. The zones comprise catalyst materials suitable for the hydrocracking of the hydrocarbon supported in a conventional manner such as by perforate plate members and the like. An inlet line 11 is provided on the top or reaction chamber 10 and an outlet line 12 is provided on the bottom of the reactor. The feedstock to the reaction chamber 10 is first introduced via conduit 43 into a preheater 15 which has heat exchange coils 16 disposed therein. The feed is heated by burners (not shown) supplied by fuel from fuel line 20. The amount of fuel supplied is controlled by control valve 21. The amount of feed supplied through line 43 is regulated by control valve 49 in line 43. Hydrogen is introduced into the system as make-up hydrogen through line 1 which connects to outlet line 12 of the reactor. The hydrogen introduced into line 12 is separated in a liquid-vapor phase separator 30 operating at an elevated pressure. From the separator 30 the hydrogen passes via line 37 through a compressor 36 and to line 43. A quench hydrogen stream is introduced into reaction chamber 10 downstream of the first bed via line 33. The amount of quenching is regulated by control valve 38 in line 33.

A hydrogen vent line 34 and a control valve 35 is provided in hydrogen recycle line 37 to vent off any excess hydrogen. Liquid effluent from separator 30 is passed through line 31 to fractionator 40 wherein the various components of the effluent are fractionated. The overhead vapor gasoline components are removed via line 42, and the liquid gasoline components are removed via line 41. The bottoms collected in the lower part of the fractionator 40 comprise fresh and recycle feed which is pumped to the reactor 10 via pump 48. Fresh feed is introduced into the fractionator via line 46 to first remove light ends although fresh feed may be introduced into line 43. The control of feed through line 46 is regulated by control valve 47. Any excess recycle feed which cannot be used in the system may be removed via line 44. The removal of excess feed is regulated by control valve 45.

The basic element of the control system for this reaction process system is a system control means 100. System control means 100 receives generated signals derived from various monitors or sensors in the system and generates adjustment signals to various controllers in the system to thus control the reactor system. A first signal used by the system control means is determined by a first sensing means connected to the inlet of the reactor which generates a signal representative of the amount of controllable reactant being supplied to the reactor. The sensing means is schematically represented by an orifice 166 placed in line 43 and connected to a flow indicator-controller 165. A flow signal is generated by flow indicator-controller 165 via transmitting line 168 to system control means 100.

The reaction severity of reactor 10 is preferably determined by the inlet temperatures as well as the outlet temperatures of the catalyst zones. Thus, there is provided temperature indicators 101, 104, 111 and 114 connected to the inlet of zone 13, the outlet of zone 13, the inlet of zone 14 and the outlet of zone 14 respectively. Devices 101 and 104 also serve as controllers with adjustable set points, although, it is also contemplated that the controller aspects of the present invention be internal to the system control means, as distinguished from the use of external controllers shown in the drawing. The actual temperature sensing devices may include conventional thermocouples and the like placed in convenient locations of the reactor. The temperature indicator devices generate electrical signals, which are transmitted via transmitting lines 102, 105 112 and 115 to system control means 100.

The flow of make-up hydrogen passing through line 1 is detected by an orifice 130 and a flow indicating device 131 generates and transmits a signal via line 132 to the system control means 100. A pressure indicator-controller 121 is connected to line 37 and transmits a pressure signal to the system control means 100 via transmitting line 122 and activates control valve 35 via line 129. The amount of flow of fresh feed is detected through orifice 146 in line 46 and the signal is transmitted by flow detector-controller 147 via line 145 to the system control means 100. The flow of any excess bottoms through line 44 is measured through orifice 156 and a signal is transmitted via flow indicator-controller 155 via transmitting line 158 to system control means 100, and the flow is controlled by control valve 45 which is connected to controller 155 via line 190. The flow of fuel to heater 15 is controlled by a flow indicator-controller 107 having a variable set point connected to an orifice 106, via line 110. Flow indicator-controller 107 is connected to control valve 21 via transmitting line 109. The set point of flow indicator-controller 107 is regulated by the temperature indicator-controller 101 which generates a signal to the flow controller via transmitting line 108. In this manner the severity of reaction can be controlled by changing the flow of fuel to heater 15. The severity of reaction can be controlled on downstream reaction zone 14 independently by regulating the amount of quench hydrogen through line 33 via control valve 38. The flow through line 33 is controlled via a flow indicator-controller 117 which has the variable set point controlled by the temperature indicator-controller 111 via transmitting line 118. Flow controller 117 is connected to an orifice 116 via line 120.

The level of the bottoms in the fractionator 40 is sensed through a conventional level sensing means and the signal is transmitted to the system control means 100 by a level indicator 141 via transmitting line 142.

The hydrocracking system is operating at best efficiency when all of the hydrogen flowing through line 1 into the system is consumed and no bottoms are being removed through line 44. Thus, no hydrogen would be vented through line 34. The first condition where all hydrogen is being consumed would be manifested by a normal operating pressure of the separator 30. This pressure is hereinafter referred to as the reference pressure, $P_c$ of the separator 30 and any deviation in this pressure is sensed in the pressure indicator-controller 121. The pressure indicator-controller 121 does not activate the valve 35 unless an upper limit in pressure is reached. The control of valve 35 may be made independent of any control signal derived from the system control means 100. However, the pressure signal derived from the pressure indicating device 121 will indicate changes in the hydrogen delivered through line 1 and consumed in the reaction process carried on in the reactor 10. In other words, given a situation where the hydrogen make-up supply remains constant, a change in pressure indicated by pressure sensing means 121 will indicate there is a change in hydrogen consumption in the reactor 10. The pressure signal will also indicate under constant reaction conditions whether or not more hydrogen is being introduced in this system via line 1 which also indicates a change in available hydrogen consumed. That is, under constant reactor conditions if more hydrogen is being introduced through line 1 the pressure in separator 30 will increase. Thus, the pressure signal from the sensing device 121 will generate a signal representative of the amount of consumption of the uncontrollable reactant hydrogen being supplied to the reactor. It consequently represents the fourth sensing means referred to in the Summary of Invention. This signal is utilized by the system control means for generating a signal for controlling the reaction severity in the reactor to thus utilize optimum amounts of hydrogen in the reaction process.

The reaction severity in the reactor may be controlled in various manners. One embodiment merely utilizes temperature controllers having inlet temperature set points. In other words, temperature indicator-controllers 101 and 111 would have controllable inlet temperature set points which would be changed by electrical signal impulses generated via the system control means through transmitting lines 103 and 113 respectively. By way of example, if an increase in severity were called for by reason of an increase of pressure in separator 30 the system control means would generate signals to the temperature indicator-controllers 101 and 111 to change their respective set points. Thus, temperature recorder 101 would adjust the set point of flow controller 107 via transmitting line 108 which would adjust valve 21 to introduce a change in fuel to heater 15 which would change the temperature of the incoming feed thorugh line 43. At the same time temperature indicator-controller 111 would adjust the set point of flow controller 117 to change the amount of hydrogen quench via valve 38 in line 33.

Since it is not always true that the inlet conditions of reaction beds accurately indicate the severity of reaction in a reaction zone, a refinement utilizes the differential temperatures of the catalyst beds to maintain a given severity. In other words, the set points of controllers 101 and 111 may be defined to include the temperature differential across each bed in the reactor.

A variation of the differential temperature set point concept is in the use of a signal derived from the function of the outlet temperature of each bed to control the inlet temperature set points of the inlet temperature controllers. In this embodiment outlet temperature set points of each reaction zone would be stored in the system control means. The system control means would compute an adjustment signal for the set points of the inlet temperature controllers. This signal is preferably made equal to the sum of two components, the first component being proportional to the difference between the products resulting from the subtraction of each of the two most recent outlet temperatures measured from the outlet temperature set point corresponding to the catalyst bed in question. The second component is proportional to an integral function of the deviation of the outlet temperature from the outlet temperature set point. This component is proportional to the sum of the differences between the outlet temperature set point and at least three most recent outlet temperatures measured. Preferably, the five most recent outlet temperatures measured are used in this computation. A component proportional to a differential function of the outlet temperature is not normally considered necessary or desirable. In computing the change in magnitude of the temperature control signals from the system control means to the temperature control means, the magnitude of the amount of change in the temperature control signal may be expressed, in a preferred form, by an equation as follows:

$$X_T = K_t \left[ (T_c - T_n) - (T_c - T_{n-1}) + K_{1t} \sum_{n=0}^{5} (T_c - T_n) \right]$$

In this equation $X_T$ is the change in magnitude of the temperature control signal derived by the system control means 100 and transmitted to the set point of the temperature controller at the inlet of each bed. $K_t$ is a constant applied to the temperature function. $T_c$ is the outlet temperature set point of the catalyst bed considered, $T_n$ is the actual outlet bed temperature measured during scan member "$n$" and $K_{1t}$ is a constant to be applied to the integral function of outlet temperature. When utilizing this form of temperature control any pressure control signal from the system control means would adjust the outlet temperature set points.

The first component in this equation is normally the most significant in determining the magnitude of the signal $X_T$. That is, the difference between the deviations of each of the two most recent outlet temperatures measured from the outlet set point is the most significant factor in determining the magnitude of change in the temperature control signal $X_T$. Preferably, $X_T$ must first reach a certain minimum value before it indicates a change in the inlet and outlet temperature. This is to preclude unnecessary temperature adjustment resulting from outlet temperature measurement deviations which are within the allowable air limits of the outlet temperature measurement device of the temperature controller means.

Regardless of the particular type of temperature control utilized for control of the reactant severity, it is important to note that the present invention provides that ultimately the control of severity is determined by the amount of consumption of the uncontrollable reactant, hydrogen, being supplied to the system. The system control means has first computer means for generating an adjustment signal proportional to the changes in this value. In this preferred embodiment the pressure signal derived by pressure sensing means 121 is used to determine the consumption of hydrogen supplied to the reaction system. Preferably the system control means comprises digital computer means which stores a digital representation of a reference signal representing a normal amount of consumption of hydrogen being supplied to the reactor. The system control means scans the pressure sensing means and measures pressure at predetermined intervals of time and generates an adjustment signal through the inlet temperature controllers uitlized, or interiorally adjusts the outlet temperature set points if the alternate form of temperature control is utilized. This adjustment signal is preferably proportional to the sum of a component proportional to the difference between quantities resulting from subtraction of the most recent pressure reading and the reference pressure reading; a component proportional to the sum of the differences between the reference pressure and at least the three most recent pressure readings; and a component proportional to the sum of the difference between consecutive pressure readings measured including at least five differences between the most recent pressure readings. Of course, more pressure reading may be utilized in the last component. This statement may be represented by the following equation:

$$X_p = K_p \left[ (P_c - P_n) - (P_c - P_{n-1}) + K_{ip} \sum_{n=0}^{n=3} (P_c - P_n) + K_{dp} \sum_{n=0}^{n=5} (P_n - P_{n-1}) \right]$$

In the equation the term $X_p$ is the pressure control signal generated by the system control means to operate the temperature controllers by adjusting the temperature set points of the temperature controllers utilized. $K_p$ is a constant applied to the pressure function, $P_c$ is the normal operating pressure, $P_n$ is the actual pressure measurement taken during a scan number "$n$", $K_{ip}$ is a constant applied to the integral function of pressure and $K_{dp}$ is a constant applied to the differential function of pressure. In the computation of $X_p$, the first component is normally the large component in determinging the signal. That is, the component proportional to the difference between the products resulting from the subtraction of the two most recent pressures measured from the normal operating pressure is normally the most significant component in determining $X_p$. As was true of the preferred form of severity maintenance, once the magnitude of the pressure control signal to the temperature control means has been determined, it is frequently desirable to arrange the system control means and the temperature control means so that an increment in the pressure control signal to the temperature control means must achieve at least a minimum magnitude before the temperature control means is actuated thereby. This feature prevents unnecessary cycling of the reactor system due to minor signal variations from the pressure sensing means that lie within the tolerable and acceptable range of error of the pressure measurements.

From the foregoing it is seen that the system will be self adjusting to utilize all of the hydrogen being supplied to the system. However, with an increase in severity, an increase in consumption of hydrogen will result, and thus more of the feed introduced into the reactor via recycle line 43 will be consumed in the process. The result of this phenomena is that the level in the bottoms of the fractionator 40 will decrease. Of course, if less hydrogen is being introduced into the system the pressure control means will reduce the severity of the reaction in reactor 10 and thus the bottoms of the fractionator will increase in level. The level of the fractionator thus indicates the conversion and material balance of the system and may be used as index to optimize and stabilize the consumption of the feed in line 43. It is obvious that if more feed is being consumed, more feed will have to be introduced into the system via supply line 46 and more feed will have to be introduced into the reactor via line 43. The control of the valves 47 and 49 in lines 46 and 43 is done via flow indicator-controllers 147 and 165 which have variable set points. Flow controllers 147 and 165 receive adjustment signals via lines 148 and 167 from the system control means 100 to change their respective set points. The flow controllers in turn close or open thier respective valves via transmitting lines 149 and 169. If an overflow situation occurs, flow controller 155 receives a signal from the system control means 100 via line 157 to release bottoms from the fractionator via conduit 44.

The adjustment signal for the flow control valves is determined by the system control means which will include computer means for computing the change of level with respect to time and also for computing a variable parameter of comparison. The system control means may include an analogue computer, a digital computer with analoque conversion means, or a completely digital system. It must include means for computing the change of the level of the bottoms in fractionator 40 with respect to time. The system control means will further comprise a first comparator means for comparing the rate of change of the level with respect to time with the parameter of comparison and for generating a signal to activate the flow control means in response to this comparison. A second comparator means is included in the system control means for comparing the actual value of the level with predetermined limits of deviation and for generating an adjustment signal in response to this comparison. The system control means will of course have means for storing the values of the limits of the level.

When the level lies beyond the limits and when the change of the level with respect to time indicates that the value will continue to depart from such limits, the comparator means will generate an adjustment signal to alter the rate of change of the level. The alteration is always proportional to the computed change of level with respect to time and in this case will be made sufficient to effect a reversal trend or in other words include a reversal proportionality constant or addition constant which will reverse the trend.

The parameter of comparison will comprise a first variable parameter whose value is representative by the formula:

$$N = \left| \frac{L_n - L_p}{\Delta t} \right|$$

wherein $N$ is the first variable parameter, $L_n$ is the value of the level, $L_p$ is the more proximate limit and $\Delta t$ is the arbitrary time period.

When the absolute value of the change of level with respect to time exceeds the first parameter, ($N$), the comparator means will generate a signal to the controller means 147 and 165. The alteration made under this circumstance is proportional to the change of the level with respect to time. However, when the level lies within the limits and when the level is approaching the more proximate limit the correction will also include a trend reversal signal.

The parameter of comparison may further comprise a second variable parameter whose value is given by the absolute value of: the difference between the measured level and the more distant limit, both with respect to time. This statement may be represented by the formula:

$$M = \left| \frac{L_n - L_d}{\Delta t} \right|$$

where $M$ is the second variable parameter, $L_n$ is the measured level, $L_d$ is the value of the more distant limit, and $\Delta t$ is an arbitrary time period. When the absolute value of the rate of change of level exceeds this second variable parameter ($M$), the correction will also be computed so that a trend reversal occurs.

Preferably, the system control means will comprise a digital computer which will receive a signal from the level sensor, convert it to digital components and after determining proper signals for control, convert them back to analogue signals for use by controller means 147 and 165. The digital computer will comprise clock means located therein that will periodically scan incoming signals from the level sensing means 141 at predetermined intervals of time. The computer will comprise differentiating means for computing the change of the value of the desired property with respect to a predetermined time increment corresponding to at least one of the time intervals it scans. It will also have storage means for storing values of the level as well as the values of predetermined limits.

Figure 2:
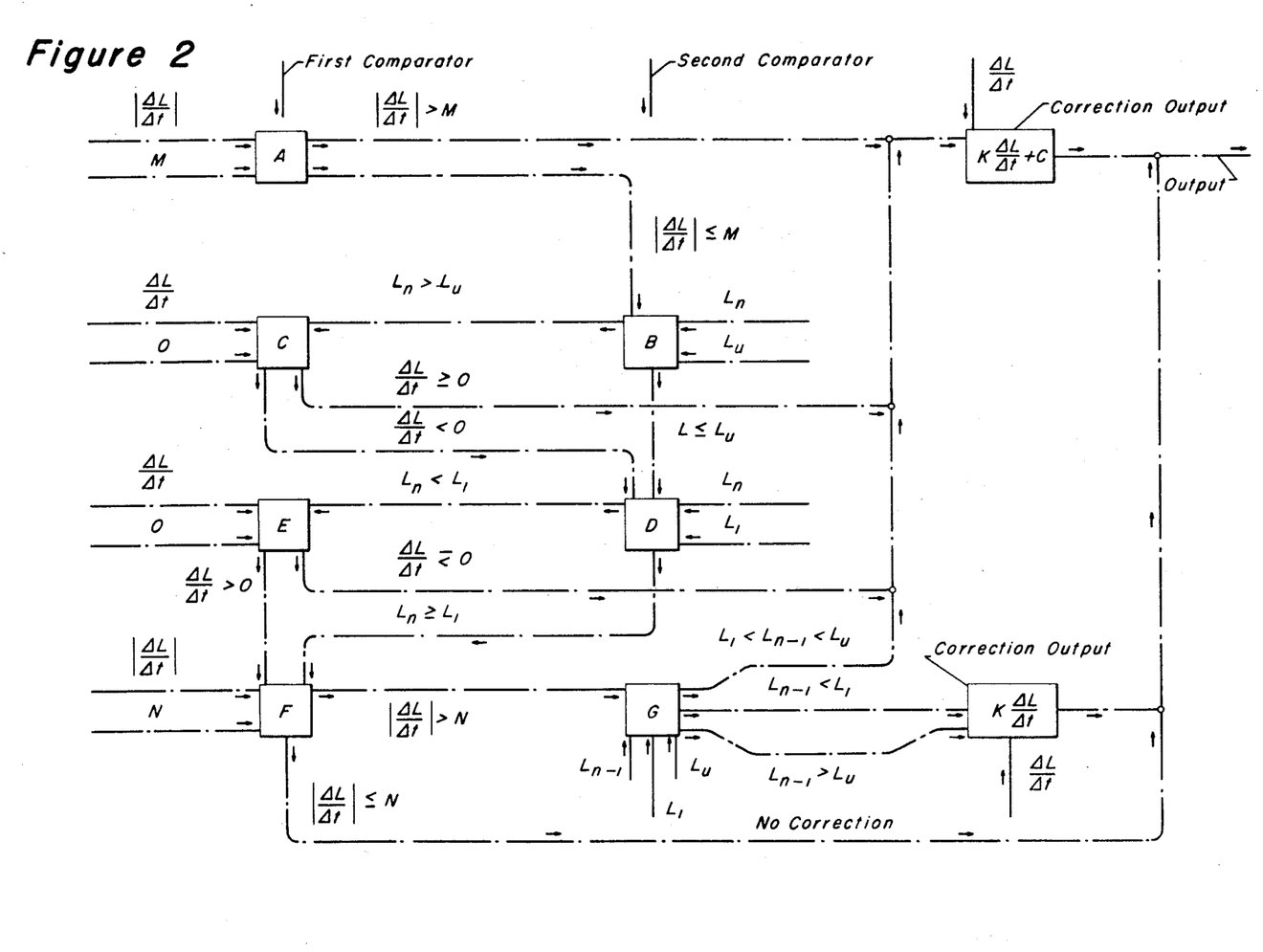
FIG. 2 of the drawing is a block flow diagram of one aspect of the control system.

A typical flow sheet for the control of the feed is shown in FIG. 2 of the drawing. The letter N corresponds to the first variable parameter whose value is equal to the absolute value of the difference between the level and the more proximate limit; divided by the predetermined time increment. The letter M corresponds to the second variable parameter whose value is computed to be equal to the absolute value of the difference between the level and the more distant limit divided by the predetermined time increment. $\Delta L/\Delta t$ is the change of level with respect to the time increment.

$L_l$ corresponds to the lower limit, $L_u$ corresponds to the upper limit, $L_n$ and $L_{n-1}$ correspond to the values of the level of the present time and at the time one increment earlier respectively. $K$ is an arbitrary constant of proportionality. $C$ is a constnat whose value will effect reversal of trend. Reversal also can be effected by varying the proportionality constant. It is assumed that the second computer means has already calculated $M$, $N$, $\Delta L/\Delta t$ and stored the quantities of $L_n$ and $L_{n-1}$ as well as the lower limit $L_l$ and the upper limit $L_u$ and other information necessary to make decisions.

Referring to block A of FIG. 2 it is seen that the input of the absolute value of $\Delta L/\Delta t$ and the input $M$ are compared in a circuit of the first comparator. If the absolute value of $\Delta L/\Delta t$ is greater than $M$, the comparator will allow the generation of a correction signal proportional to $\Delta L/\Delta t$ plus the constant which will help turn around the process. If the absolute value of $\Delta L/\Delta t$ is less than or equal to $M$ the logical flow will go to block B of the second comparator where $L_n$ is compared with the upper limit $L_u$. If $L_n$ is greater than $L_u$, the logical step is to see if $\Delta L/\Delta t$ is increasing, which is done in block C of the first comparator by the comparison of $\Delta L/\Delta t$ with O. If $\Delta L/\Delta t$ is equal to or greater than 0 the comparator means allows the generation of a correction signal proportional to $\Delta L/\Delta t$ plus a constant. If $\Delta L/\Delta t$ is less then 0 than the next logical step is block D. Also, if $L_n$ is less than or equal to the upper limit, the next logical step is block D of the second comparator where $L_n$ is compared with a lower limit $L_1$. If $L_n$ is less than the lower limit the logical step is block E of the first comparator where $\Delta L/\Delta t$ is compared with 0 again. If $\Delta L/\Delta t$ is equal to or less than 0 the comparator means will allow the generation of a signal proportional to $\Delta L/\Delta t$ plus the constant. If $\Delta L/\Delta t$ is greater than 0, the next step shown is block F. Also, if $L_n$ is greater than or equal to the lower limit $L_1$ the next logical step is block F. In block F, the absolute value of $\Delta L/\Delta t$ is compared with $N$; if the absolute value of $\Delta L/\Delta t$ is less than or equal to N, no correction is made. If the absolute value of $\Delta L/\Delta t$ is greater than N, the next logical step is shown in block $G$ where $L_{n-1}$ is compared with the lower limits and the upper limits. If $L_{n-1}$ is greater than the lower limit and less than the upper limit the correction is proportional to $\Delta L/\Delta t$ plus a constant. If $L_{n-1}$ is less than the lower limit or greater than the upper limit then the correction is merely proportional to $\Delta L/\Delta t$ which is basically a line out correction.

Figure 3:
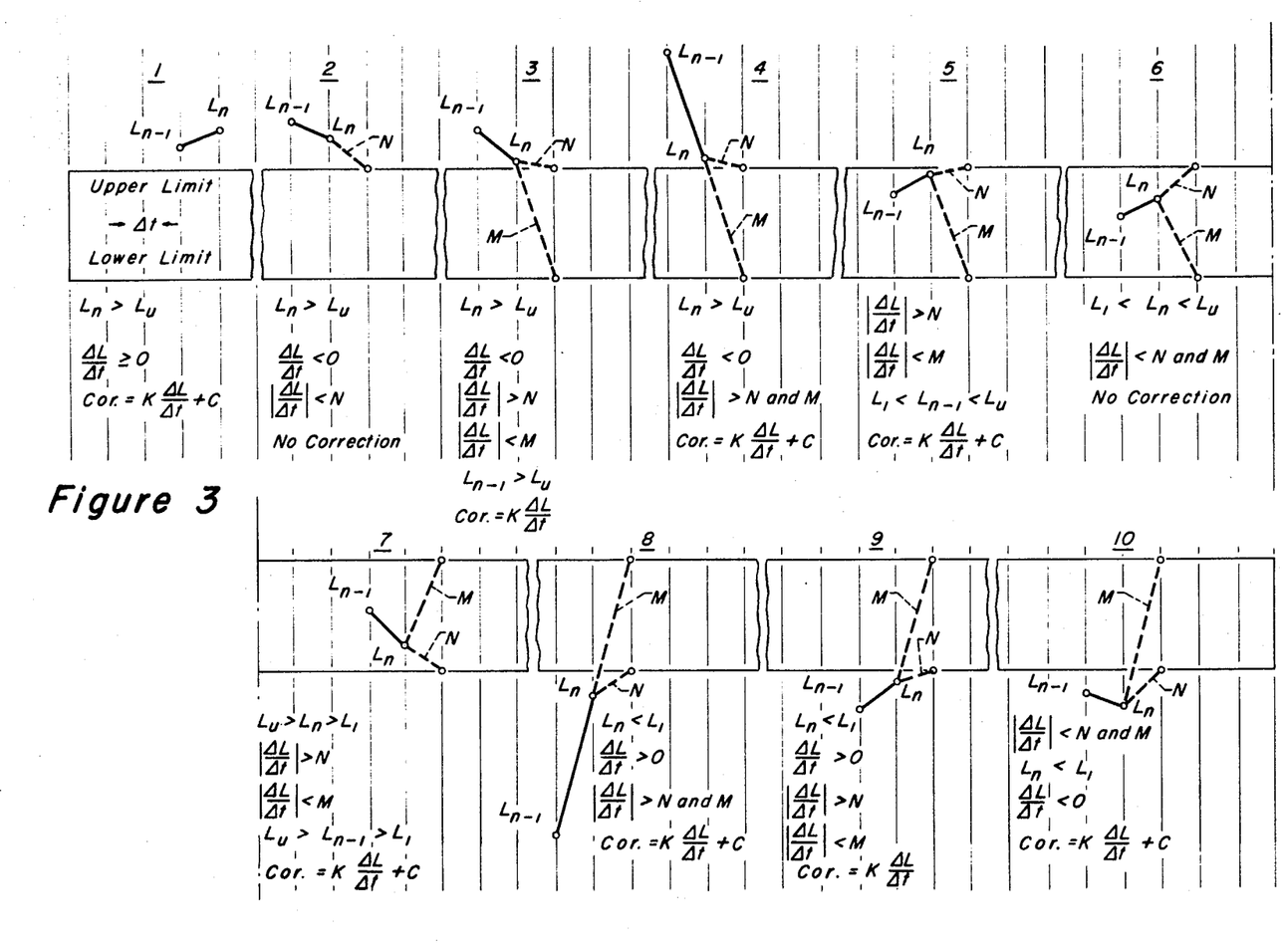
FIG. 3 of the drawing shows schematically a series of curves which represent changing level and correction moves made by the control system.

In FIG. 3 there is shown various curves showing the positions $L_{n-1}$ and $L_n$ as well as calculated quantities $N$ and $M$. It is noted that the slope from $L_{n-1}$ to $L_n$ is equal to $\Delta L/\Delta t$ if the space between the vertical lines is equal to $\Delta t$. It is seen that in example 1, $L_n$ is greater than $L_u$ and $\Delta L/\Delta t$ is greater than or equal to 0. Thus, the correction move is proportional to $\Delta L/\Delta t$ plus a constant. In example 2, $L_n$ is greater than $L_1$ but $\Delta L/\Delta t$ is less than 0. Furthermore, the absolute value of $\Delta L/\Delta t$ is less than $N$; therefore, no correction is needed. In curve No. 3, it is seen that $L_n$ is greater than $L_u$ but $\Delta L/\Delta t$ is less than 0. However, the absolute value of $\Delta L/\Delta t$ is greater than $N$ and therefore a correction output is needed. The absolute value of $\Delta L/\Delta t$, however, is less than $M$ and $L_{n-1}$ is greater than the upper limit therefore the correction is merely proportional to $\Delta L/\Delta t$ which incidates a line out move. In example 4 of FIG. 3, $L_n$ again is greater than the upper limit but $\Delta L/\Delta t$ is less than 0. However, the absolute value of $\Delta L/\Delta t$ is greater than $N$ and $M$; therefore the correction is proportional to $\Delta L/\Delta t$ plus a constant. In example 5 the absolute value of $\Delta L/\Delta t$ is greater than $N$ and the absolute value of $\Delta L/\Delta t$ is less than $M$. Typically, this would indicate that the correction should be the line out move without a constant added but $C_{n-1}$ is greater than the lower limit and less than the upper limit and therefore the constant is added to the correction and the correction is proportional to $\Delta L/\Delta t$ plus C. In example 6 the absolute value of $\Delta L/\Delta t$ is less than $N$ and $M$ and $L_n$ is within the limits; therefore no correction is made. In example 7 the absolute value of $\Delta L/\Delta t$ is greater than $N$ but less than $M$ and $L_n$ lies within the limits. However, $L_{n-1}$ is also within the limits and therefore the correction is proportional to $\Delta L/\Delta t$ plus the constant. In example 8, $L_n$ is less than the lower limit but $\Delta L/\Delta t$ is greater than 0 so no correction is made on this account. However, the absolute value of $\Delta L/\Delta t$ is greater than $M$ and thus greater than $N$ so the correction is proportional to $\Delta L/\Delta t$ plus the constant. In example 9, $L_n$ is less than the lower limit but $\Delta L/\Delta t$ is greater than 0 so no correction is made on thqt account. The absolute value of $\Delta L/\Delta t$ is greater than $N$ but less than M; therefore, the correction is proportional to $\Delta L/\Delta t$ with no turn around constant added. The correction is merely a line out move. In example 10 the absolute value of $\Delta L/\Delta t$ is less than M and N but $L_n$ is less than the lower limit and $\Delta L/\Delta t$ is less than zero. Therefore a correction is called for proportional to $\Delta L/\Delta t$ plus the turn around constant.

From the foregoing description it is seen that the advantage of the level control part of the system is that the correction moves are not made constantly, nor are they made at predetermined intervals of time. The process is allowed to continue wihout correction unless the absolute value of the change in level with resepect to time is greater than $N$ or if the value of the level $L_n$ is beyond the limits and continuing to depart from such limits. Thus, the moves are not merely timed moves but are made only when the value of the level and change of the level with respect to time exceeds certain parameters. The correction iteslf is always proportional to the rate of change of the level. When a turn around move is necessary to make the level approach or stay within the limits, a constant is added to the correction signal or a different proportionality constant is utilized.

As mentioned before, the correction signal derived from the level control aspects of this invention is proportional to be the change in level with respect to time. The proportionality constant will vary with paricular applications and particular apparatus utilized. Typically, the signal will be equal to $X_F = (-K_l \cdot K_{vt} \cdot K_a)(dl/dt)$. Where $X_F$ is the change in magnitude of the level control signal, $dl/dt$ is the rate of level change per unit time, $K_a$ is a temperature volume correction process liquids, $K_{vt}$ converts the change in level over a known time to an equivalent conversion value such as barrels per day, and $K_l$ is the proportionality constant which will depend on the frequency of change known to exist in the particular vessel and the system. A constant C may be added to this change when trend reversing situations are required. It is also possible to introduce another proportionality constant $K_x$ to reverse the trend. (The correction sign (+) or (−) of $K_l$ is dependent on whether an inflow or outflow of material or energy from the chamber is controlled.)

The system of this invention is now complete. That is, the control system will optimize and stabilize the consumption of the reactants and will utilize maximum amounts of uncontrollable hydrogen reaction. Consider the situation where no hydrogen is being vented from conduit 34, the pressure in the separator 30 is maintaining a constant value, and no bottoms are being removed from line 44. Then, if a change is introduced into the system by the introduction of more or less hydrogen through conduit 1, almost immediately the pressure indicator 121 will detect a change in pressure in the separator 30 and transmit the signal to system control means 100 where an adjustment signal is determined to be used by the temperature contollers of the reactor to adjust the severity of the reactor. A change in severity will mean that there is a change in consumption of the liquid hydrocarbon feed flowing through conduit 43, which in turn means that the level within the fractionator 40 will change. The level control aspects of this system are such that no adjustmemts will be made in introducing feed into the system unless variable parameters are exceeded or, unless, the level is continuing to depart from preexisting limits of deviation.

A further refinement of the control system of this invention provides for a feed forward control of the reaction severity of the reactor dependent on the level control of the flow of the liquid hydrocarbon. In this embodiment the system control means will, in addition to controlling the flow through conduit 43 and conduit 46 in response to level comparisons, adjust the severity of reaction through the temperature controllers. This adjustment signal will be proportional to the adjustment signal determined for the control of control valves 47 and 49. This in effect is a feed forward signal to the reactor. The adjustment signal may be represented by the following formula:

$$X_{f_1} = K_{f_1} \cdot X_L$$

where $X_{f_1}$ is the adjustment signal for the temperature controllers 101 and 111 or 104 and 114, $K_{f_1}$ is a proportionality constant empirically determined by data derived from the reactor system, and $X_L$ is the correction signal determined by the level control aspects of this system control means 100. The reason for the feed forward control is to adjust the severity of reaction resulting from a change in feed flow which, if not compensated for, will likely affect the consumption of hydrogen. The pressure control aspects of the system control means will normally take care of the affect of hydrogen consumption by lowering the severity of reaction but a feed forward control will make the response time shorter and thus negate or minimize the use of the pressure control aspects of this invention. When utilizing this particular refinement, it is also possible to introduce a proportionality constant into the $X_L$ formula described above for control of the flow in conduits 43 and 46 to take in account the change in severity due to the feed forward control of the temperature controllers. Thus, the formula for the change in flow through lines 43 and 46 may be written according to the following formula:

$$F = [(-K_l \cdot K_{vt} \cdot K_a)(dl/dt)]/(1 + K_{f_1} \cdot K_f)$$

where the additional porportionality constant is $(1 + K_{f_1} \cdot K_f)$ where $K_{f_1}$ is the feed forward proportionality constant used to control the temperature controllers and where $K_f$ is a proportionality constant which takes into account the increase in reaction severity and eliminates changes in level in the fractionator 40 due to changes in severity resulting from the feed forward adjustment signal.

It is evident that the control system of this present invention may be applicable to many utilizations besides that which is illustrated in FIG. 1 of the drawing. The use of a two zone reactor should not be limiting upon the present invention for a single zone reactor, multiple reactors, as well as plurality zone reactors of more than two zones is contemplated. Furthermore, the index indicating conversion and material balance may comprise signals derived from chromatographs, connected to the resulting effluent and may include signals indicative of the material balance of the system as derived from the total flow in and total flow out of the system. Also it is possible to determine the amount of hydrogen consumed by other means than pressure sensing devices such as by hydrogen balance measurements. In this latter embodient an initial correction to the reactor temperatures and feed rate could occur in a "feed forward" mode based on the change in hydrogen flow as sensed, followed by action of the control system in the manner previously described.

We claim as our invention:

1. In a reaction process system having at least one reactor with inlet means for introducing at least two reactants, one being in uncontrollable and varying supply and the second being in a controllable supply, and with outlet means for discharging the reactor effluent therefrom, a control system for optimizing and stabilizing consumption of the reactants which maintains an index indicative of conversion and material balance of the system within predetermined limits of deviation ocmprising in combination:
   a. first regulating means connected to the inlet means for regulating the supply of the controllable reactant;
   b. second regulating means connecting to said reactor for regulating the severity of reaction therein;
   c. first sensing means connected to said reaction process system for generating a signal representative of the amount of controllable reactant being supplied to the reactor;
   d. second sensing means connecting to said reaction process system for generating a singal representative of the severity of the reaction therein;
   e. third sensing means connecting to said reaction process system for generating a signal representative of the index indicative of conversion and material balance of the system;
   f. fourth sensing means connecting to said reaction process system for generating a signal representative of the amount of consumption of uncontrollable reactant being supplied to said reactor;
   g. first controller means connecting to said first regulating means for controlling the regulation thereof;
   h. second controller means connecting to said second regulating means for controlling the regulation thereof; and,
   i. system control means connecting to said sensing means and to said controller means for receiving said generated signals and for generating adjustment signals for controlling said reactor system, said system control means including: (1) first computer means for determining changes in the signal representative of the amount of consumption of the uncontrollable reactants being supplied to said system and for generating an adjustment signal proportional to the changes for activating the second controller means to control the severity of reaction, whereby optimum amounts of uncontrollable reactant may be consumed; (2) second computer means for computing the change of said index with respect to time and for determining a parameter of comparison whose value is a function of the value of the index; (3) first comparator means for comparing the change of the index with respect to time with said parameter of comparison and for generating a signal for activating said first controller means in response to said comparison; and, (4) second comparator means for comparing the actual value of the index with the limits of deviation and for generating a singal for activating said first controller means in response to said comparison.

2. The reaction process system of claim 1 wherein said second sensing means comprises temperature sensing means for determining temperature conditions within said reactor, and wherein said second regulating means comprises means for regulating the temperature conditions within said reactant.

3. The reaction process system of claim 1 wherein:
   a. said reactor comprises at least one reaction zone;
   b. outlet temperature sensing means is connected to the outlet side of said reaction zone for generating signals for said system control means representative of the outlet temperature of said reaction zone;
   c. said second controller means comprises an inlet temperature controller having a controllable set point;
   d. said second regulating means comprises means for regulating the temperature conditions within said reaction zone;
   e. said system control means includes means for storing a contollable outlet temperature set point, said outlet temperature set point being adjusted in response to the signal generated by said first comparator means; and,
   f. said system control means includes means for scanning the signals generated by said outlet temperature sensing means at predetermined intervals of time and for comparing said signals against said outlet temperature set point and for generating adjustment signals to adjust said inlet temperature controller set point, the magnitude of said adjustable signal being equal to the sum of: a component proportional to the difference betwen the products resulting from subtraction of each of the two most recent outlet temperatures measured from the outlet temperature set point and a component porportional to the sum of the differences between the aforesaid outlet temperature set point and at least the three most recent outlet temperatures measured.

4. The reaction process system of claim 1 wherein:
   a. said system control means includes means for storing a reference signal representative of the normal amount of consumption of uncontrollable reactant being supplied to said reactor;
   b. said system control means includes means for scanning signals generated by said fourth sensing means at predetermined intervals of time and for comparing said signals against said reference signal and for generating an adjustment signal to said second controller whose magnitude is proportional to the sum of: a component porportional to the difference between the quantities resulting from subtraction of the two most recent readings of the amount of consumption of uncontrollable reactant and the reference reading; a component porportional to the sum of the differences between the reference reading and at least the three most recent readings of the amount of consumption of uncontrollable reactant; and a component poroportional to the sum of the differences between consecutive readings of the amount of consumption of uncontrollable reactant including at least five differences between the most recent readings.

5. The reaction process system of claim 1 wherein when the index lies beyond the limits, and when the direction of the change of the limit with respect to time indicates that the index will continue to depart from said limits, the comparator means will generate a singal for said first controller means whose magnitude is directly porportional to the change of the index with respect to time and also including components to reverse the trend of the index.

6. The reaction process system of claim 5 wherein said comparator means will also generate a signal to said second controller means whose magnitude is proportional at the signal to said first controller means.

7. The reaction process system of claim 1 wherein the magnitude of the adjustment signal made by said first comparator means comprises a signal proportional to the change of the index with respect to time.

8. The reaction process system of claim 1 wherein said parameter of comparison comprises a first variable parameter whose value is given by the absolute value of the difference between the measured value of the index and the more proximate limit, with respect to time, and when the change of the index with respect to time exceeds the first variable parameter, said first comparator means will generate an adjustment signal to siad first controller means proportional to the change of the index with respect to time.

9. The reaction process system of claim 8 wherein said first comparator means will also generate a signal to said second controller means proportional to the adjustment signal to said first controller means.

10. The reaction process system of claim 8 when the index lies within the limits and when the absolute value of the change of the index with respect to time exceeds the first variable parameter, and when the index is apporaching the more proximate limit, the comparator means will generate a signal to said first controller means, the generated signal being proportional to the change of the index with respect to time and including components to reverse the trend of the value of the index.

11. The reaction process system of claim 8 wherein said parameter of comparison further comprises a second variable parameter whose value is given by the absolute value of: the difference between the index and the more distant limit, with respect to time, and when the absolute value of the change of the index with respect to time exceeds the aforesaid second variable parameter, said comparator means will generate a signal to said first controller means, the signal being proportional to the change of the index with respect to time and including components to reverse the trend of the index.

12. The reaction process system of claim 1 wherein:
a. said reaction process system comprises a hydrocarbon cracking process wherein said uncontrollable reactant comprises hydrogen;
b. the reaction system further comprises a pressurized liquid-vapor phase separation means connected to the downstream side of said reactor for separating any unreacted hydrogen in a gaseous phase from the effluent of said reactor;
c. wherein fractionation means is connected donwstream form the liquid end of said separation means for separating any unreacted controllable reactant in a liquid phase from the liquid effluent;
d. said first regulation means includes means for recycling from said fractionation means unreacted controllable reactant to said reactor; and,
e. means is connected to said reactor to said separation means for recycling hydrogen from said separation means to said reactor.

13. The reaction process system of claim 12 wherein said third sensing means comprises level indicating means connected to said fractionation means for generating a signal representative of the level of liquid bottoms in said fractionation means.

14. The reaction process system of claim 12 wherein said fourth sensing means comprises pressure indicating means connected to said separation means for generating a singal representative of the pressure therein.

15. The reaction process system of claim 12 wherein said second sensing means comprises temperature sensing means connected to said reactor for generating a signal representative of temperature conditions therein.

16. The reaction process system of claim 12 wherein said fourth sensing means comprises flow sensing means connecting to said reaction process for generating a signal representative of the hydrogen consumption of the said reaction process.

* * * * *